(12) United States Patent
Wilkinson et al.

(10) Patent No.: US 10,120,384 B2
(45) Date of Patent: Nov. 6, 2018

(54) SYSTEMS AND METHODS FOR DELIVERING PRODUCTS VIA AUTONOMOUS GROUND VEHICLES TO VEHICLES DESIGNATED BY CUSTOMERS

(71) Applicant: Walmart Apollo, LLC, Bentonville, AR (US)

(72) Inventors: Bruce W. Wilkinson, Rogers, AR (US); Brian G. McHale, Chadderton Oldham (GB); Donald R. High, Noel, MO (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/837,342

(22) Filed: Dec. 11, 2017

(65) Prior Publication Data
US 2018/0164818 A1    Jun. 14, 2018

Related U.S. Application Data

(60) Provisional application No. 62/432,836, filed on Dec. 12, 2016.

(51) Int. Cl.
| G05D 1/00 | (2006.01) |
| G05D 1/02 | (2006.01) |
| G01C 21/34 | (2006.01) |
| G06K 9/00 | (2006.01) |
| G06Q 10/08 | (2012.01) |
| G01S 19/01 | (2010.01) |
| G06Q 50/28 | (2012.01) |

(52) U.S. Cl.
CPC .......... G05D 1/0088 (2013.01); G01C 21/34 (2013.01); G01S 19/01 (2013.01); G05D 1/00 (2013.01); G05D 1/02 (2013.01); G05D 1/0278 (2013.01); G06K 9/00 (2013.01); G06K 9/00825 (2013.01); G06Q 10/08 (2013.01); G06Q 10/08355 (2013.01); G06Q 50/28 (2013.01); G05D 2201/0213 (2013.01)

(58) Field of Classification Search
CPC .............. G05D 1/0088; G05D 1/0278; G05D 2201/0213; G06Q 10/08355; G06K 9/00825; G01C 21/34
See application file for complete search history.

(56) References Cited

U.S. PATENT DOCUMENTS

| 7,725,232 | B2 | 5/2010 | Maekelae | |
| 9,230,236 | B2 | 1/2016 | Villamar | |
| 9,550,577 | B1 | 1/2017 | Beckman | |
| 9,573,684 | B2 | 2/2017 | Kimchi | |
| 9,786,187 | B1 * | 10/2017 | Bar-Zeev | G08G 5/003 |
| 9,796,529 | B1 * | 10/2017 | Hoareau | B65G 1/1373 |
| 2004/0236635 | A1 | 11/2004 | Publicover | |

(Continued)

OTHER PUBLICATIONS

PCT; App. No. PCT/2017/064649; International Search Report and Written Opinion dated Jan. 30, 2018.

*Primary Examiner* — Mary Cheung
(74) *Attorney, Agent, or Firm* — Fitch, Even, Tabin & Flannery LLP (57) ABSTRACT

In some embodiments, methods and systems are provided that provide for facilitating delivery, via autonomous ground vehicles, of products ordered by customers of a retailer to physical locations of vehicles designated by the customers.

20 Claims, 3 Drawing Sheets

(56) References Cited

U.S. PATENT DOCUMENTS

| | | |
|---|---|---|
| 2011/0254503 A1 | 10/2011 | Widmer |
| 2014/0072177 A1 | 3/2014 | Chou |
| 2014/0136414 A1 | 5/2014 | Abhyanker |
| 2014/0164126 A1 | 6/2014 | Nicholas |
| 2014/0330456 A1* | 11/2014 | Lopez Morales ............................ G06Q 10/08355 701/3 |
| 2015/0006005 A1 | 1/2015 | Yu |
| 2015/0094883 A1 | 4/2015 | Peeters |
| 2015/0120094 A1 | 4/2015 | Kimchi |
| 2015/0242811 A1 | 8/2015 | Gillen |
| 2015/0277440 A1 | 10/2015 | Kimchi |
| 2016/0196755 A1 | 7/2016 | Navot |
| 2016/0257401 A1 | 9/2016 | Buchmueller |
| 2017/0110017 A1 | 4/2017 | Kimchi |
| 2018/0053141 A1* | 2/2018 | Shydo, Jr. .............. G05D 1/104 |

\* cited by examiner

SYSTEMS AND METHODS FOR DELIVERING PRODUCTS VIA AUTONOMOUS GROUND VEHICLES TO VEHICLES DESIGNATED BY CUSTOMERS

CROSS-REFERENCE TO RELATED APPLICATION

This application claims the benefit of U.S. Provisional Application No. 62/432,836, filed Dec. 12, 2016, which is incorporated herein by reference in its entirety.

TECHNICAL FIELD

This invention relates generally to providing purchased products to customers and, in particular, to delivering products purchased by customers via autonomous ground vehicles.

BACKGROUND

Customers often purchase products from retailers over the internet. Generally, the products purchased by a customer are delivered to a physical address provided by the customer, for example, a home where the customer lives, or an office where the customer works. Products delivered to a home address and left on the property of the customer when the customer is not home (e.g., at work) may be stolen and/or damaged (e.g., by people or weather) before the product is picked up by the customer. On the other hand, delivering products to an office of the customer may be logistically difficult when large office buildings are involved, and may often be ineffective since the customer may be busy and unable to accept the product from the delivery service, which undesirably forces the delivery service to either attempt to redeliver the product, or to return the product back to the retailer, increasing the delivery costs. In addition, unmanned delivery vehicles (e.g., autonomous ground vehicles (AGVs), unmanned aerial vehicles (UAVs), or the like) are not likely to be allowed inside of office buildings in order to deliver products to a person in an office.

BRIEF DESCRIPTION OF THE DRAWINGS

Disclosed herein are embodiments of systems, apparatuses, methods, and systems pertaining to delivering, via AGVs, products ordered by a customer to a physical location of a vehicle designated by the customer. This description includes drawings, wherein.

Elements in the figures are illustrated for simplicity and clarity and have not been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Generally speaking, pursuant to various embodiments, systems and methods are provided for facilitating delivery of products ordered by a customer of a retailer to a physical location of a vehicle designated by the customer via an autonomous ground vehicle.

In some embodiments, a system of facilitating delivery of products ordered by a customer of a retailer to a physical location of a vehicle designated by the customer via an autonomous ground vehicle includes an order processing server of the retailer configured to process an order for a product placed by a customer. The order for the product placed by the customer specifies that the product be delivered via the autonomous ground vehicle to a physical location of the vehicle designated by the customer. The system includes a computing device of the retailer including a processor-based control circuit and configured to obtain global positioning system (GPS) coordinates of the physical location of the vehicle designated by the customer. The control circuit is configured to analyze the obtained GPS coordinates of the physical location of the vehicle designated by the customer, determine a route for an autonomous ground vehicle to the physical location of the vehicle designated by the customer, and transmit a first electronic notification to the autonomous ground vehicle including route instructions to guide the autonomous ground vehicle to the physical location of the vehicle designated by the customer along the determined route. The autonomous ground vehicle, upon receipt of the first electronic notification from the computing device, is configured to navigate, based on the route instructions, to the physical location of the vehicle designated by the customer while retaining the products ordered by the customer therein, to remain proximate the vehicle designated by the customer while retaining the products ordered by the customer therein, and to permit the customer to retrieve the products ordered by the customer therefrom.

In other embodiments, a method for facilitating delivery of products ordered by a customer of a retailer to a physical location of a vehicle designated by the customer via an autonomous ground vehicle includes: providing an order processing server of the retailer configured to process an order for a product placed by a customer, the order for the product placed by the customer specifying that the product be delivered via the autonomous ground vehicle to a physical location of the vehicle designated by the customer; providing a computing device of the retailer including a processor-based control circuit, the computing device configured to obtain global positioning system (GPS) coordinates of the physical location of the vehicle designated by the customer; analyzing, via the control circuit of the computing device, the obtained GPS coordinates of the physical location of the vehicle designated by the customer; determining a route for an autonomous ground vehicle to the physical location of the vehicle designated by the customer; and transmitting a first electronic notification to the autonomous ground vehicle including route instructions to guide the autonomous ground vehicle to the physical location of the vehicle designated by the customer along the determined route, the autonomous ground vehicle, upon receipt of the first electronic notification from the computing device, navigating, based on the route instructions, to the physical location of the vehicle designated by the customer while retaining the products ordered by the customer therein, remaining proximate the vehicle designated by the customer while retaining the products ordered by the customer therein, and permitting the customer to retrieve the products ordered by the customer therefrom.

Figure 1:
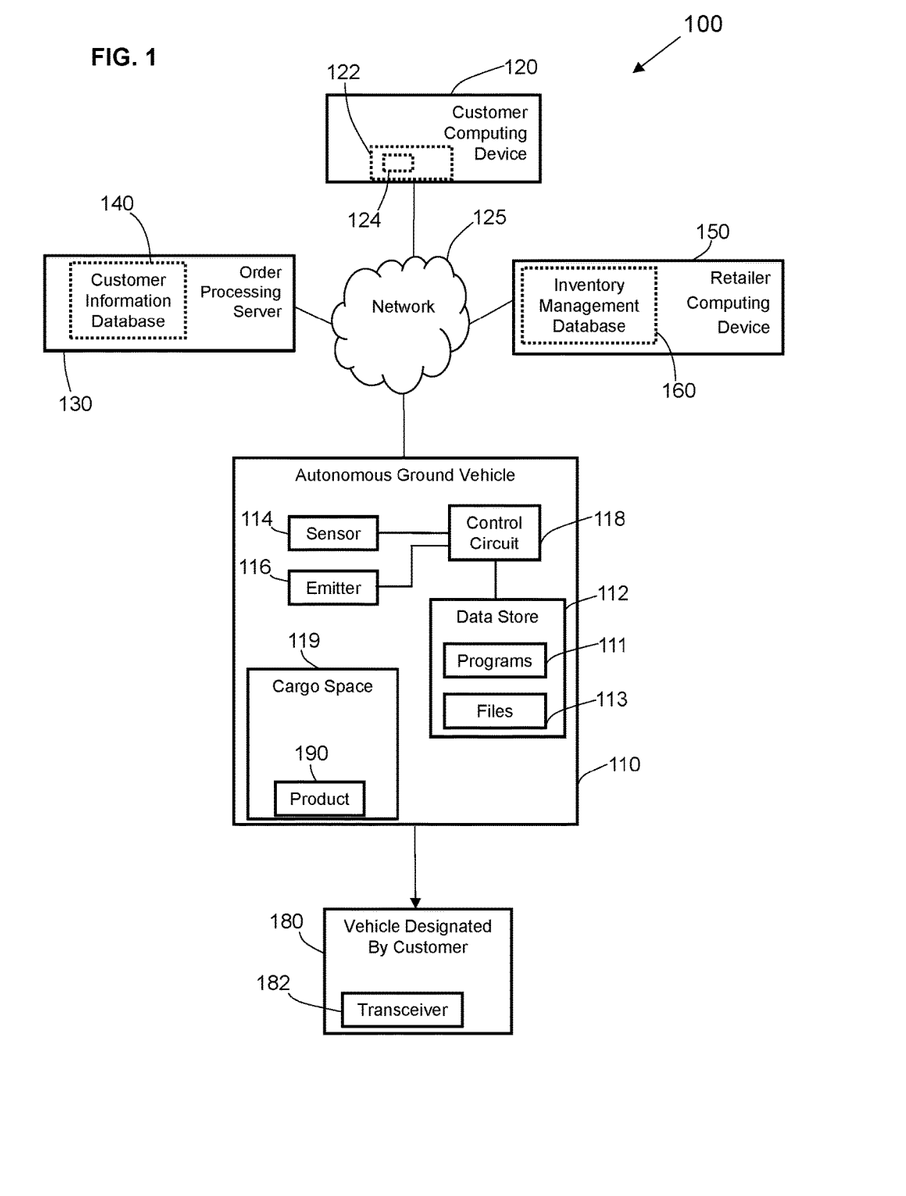
FIG. 1 is a diagram of a system for facilitating delivery via AGVs of products ordered by a customer of a retailer to a physical location of a vehicle designated by the customer in accordance with some embodiments.

FIG. 1 shows an embodiment of a system 100 for delivering, via an AGV 110, one or more products 190 purchased by a customer from a retailer to a physical location of a vehicle 180 designated by the customer. It will be understood that the details of this example are intended to serve in an illustrative capacity and are not necessarily intended to suggest any limitations in regards to the present teachings. The retailer may be any entity operating as a brick-and-mortar physical location and/or a website accessible, for example, via the internet or another network, by way of which products 190 may be ordered by a consumer (e.g., customer of the retailer). A customer may be an individual or business entity. Exemplary products 190 that may be ordered by the customer via the system 100 may include, but are not limited to, general-purpose customer goods and consumable products (e.g., food items, medications, or the like).

The exemplary system 100 depicted in FIG. 1 includes an order processing server 130 of the retailer configured to process a purchase order by the customer for one or more products 190. The order processing server 130 may be implemented as one server at one location, or as multiple interconnected servers stored at multiple locations operated by the retailer, or for the retailer. As described in more detail below, the order processing server 130 may communicate with one or more electronic devices of system 100 via a network 125.

The network 125 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, cellular, Wi-Fi or Bluetooth networked components or the like. In some embodiments, one or more electronic devices of system 100 may include cloud-based features, such as cloud-based memory storage.

In the embodiment of FIG. 1, the order processing server 130 is coupled to a customer information database 140. In some embodiments, the customer information database 140 may be configured to store information associated with customers of the retailer who order products 190 from the retailer. In some embodiments, the customer information database 140 may store electronic information including but not limited to: personal information of the customers, including payment method information, delivery address information and any known delivery access restrictions associated with the physical location of the vehicle 180 designated for accepting delivery by the customer, product order history, pending order status, product order options, as well as product delivery options of the customer.

The customer information database 140 may be stored, for example, on non-volatile storage media (e.g., a hard drive, flash drive, or removable optical disk) internal or external to the order processing server 130, or internal or external to computing devices separate and distinct from the order processing server 130. It will be appreciated that the customer information database 140 may likewise be cloud-based. In some embodiments, the order processing server 130 may be also coupled to an electronic database configured to store information associated with the inventory of products 190 made available by the retailer to the customer. In other words, while the order processing server 130 is illustrated in FIG. 1 as being coupled to one electronic database (i.e., customer information database 140), it will be appreciated that the order processing server 130 may be additionally coupled to an electronic database akin to the inventory management database 160 configured to store product inventory information In some embodiments, when a customer initially sets up an online account with the retailer, the system 100 (i.e., order processing server 130 or another server on the system 100 dedicated to new customer sign-up) is configured to permit the customer to generate a customer profile including personal information of the customer (e.g., name, address, phone number, and the like), payment methods (e.g., credit card information), as well as product delivery settings of the customer (e.g., preferred delivery address and/or preferred delivery method). It will be appreciated that the customer may select new options and/or update previously selected options at any time after setting up the account with the retailer. In some embodiments, the personal information of the customer and any product delivery options selected by the customer are stored in the customer information database 140 for subsequent retrieval by the order processing server 130 and/or by a retailer computing device 150 (e.g., in response to a login request by the customer, or product order placement by the customer).

The customer may access the order processing server 130 of the retailer via a customer computing device 120, which may be a stationary, portable, and/or hand-held electronic device, for example, a desktop computer, a laptop computer, a tablet, a mobile phone, or any other electronic, processor-based device that may be configured for data entry and communication with the order processing server 130 over the network 125. In some embodiments, the customer may access the order processing server 130 of the retailer via a graphical interface 122 displayed to the customer on the customer computing device 120. The graphical interface 122 may include one or more graphical input fields 124 in the form of menu options and/or sub-interfaces that permit the customer to place an order for one or more products 190 and to select a delivery option for one or more products 190 ordered by the customer. In some embodiments, the graphical interface 122 may be a retailer-associated mobile application (app) installed on the customer computing device 120 and configured to display various above-described menu options, notifications, and/or alerts for the customer. For example, electronic alerts may be transmitted to the customer computing device 120 via the network 125 from the retailer computing device 150 and/or from the order processing server 130 and displayed to the customer via the graphical interface 122.

In some embodiments, as the customer is attempting to connect (e.g., via the customer's computing device 120 such as a cell phone) to the retailer's website, the order processing server 130 may request a verification of the identity (e.g., username/password) of the customer. The order processing server 130 may first verify the identity of the customer (e.g., by comparing the username/password data entered by the customer into the login interface against username/password data in the profile of the customer stored in the customer information database 140). The order processing server 130 may then associate the customer profile with the identity of the customer, retrieve the customer profile from the customer information database 140 based on information stored in the profile, and send the retrieved customer account information to the customer computing device 120, which includes a graphical interface 122 including one or more input fields 124 that permit the customer to customize various options relating to the ordering of products 190 from the retailer and/or the delivering of the ordered products 190 to the customer.

In some embodiments, after placing an on order for one or more products 190 via the order processing server 130 using the graphical interface 122 of the customer computing device 120, the customer can specify that the product 190 ordered by the customer is to be delivered to a physical location of a vehicle 180 designated by the customer. In some embodiments, the customer is permitted to specify that the product(s) 190 ordered by the customer be delivered to a geographic location of the customer computing device 120 located inside of the vehicle 180 designated for delivery by the customer. In some embodiments, prior to and/or after the commencement of a delivery attempt of the products 190 ordered by the customer via an AGV 110, the retailer computing device 150 is configured to track the geographic location of the vehicle 180 designated as the delivery location the customer and/or track the geographic location of the customer computing device 120 (e.g., left by the customer in the vehicle 180) via global positioning system (GPS) data associated with the vehicle 180 and/or the customer computing device 120. In one approach, the retailer computing device 150 is configured to set the identity of the delivery location based on the tracked geographic location of the vehicle 180 designated by the customer or the tracked geographic location of the customer computing device 120.

In some embodiments, the order processing server 130 is configured to receive and process an order by a customer for a product 190 from the customer computing device 120, to receive and process payment for the product 190 from the customer, and to transmit (e.g., to the retailer computing device 150 via the network 125) the customer's selection of an option to have the ordered products 190 delivered to a physical location of the vehicle 180 designated as the delivery location by the customer who placed the order. It will be appreciated that while the order processing server 130 and the retailer computing device 150 may be located at separate physical locations (e.g., regional/central data center, product distribution center, retail store, or the like), the retailer computing device 150 and the order processing server 130 of the system 100, in some embodiments, may be confined to a single facility.

The retailer computing device 150 may be a stationary or portable electronic device, for example, a desktop computer, a laptop computer, a tablet, a mobile phone, or any other electronic device including a processor-based control circuit (i.e., control unit). For purposes of this specification, the term "retailer computing device" will be understood to refer to a computing device owned by the retailer or any computing device owned and/or operated by an entity (e.g., manufacturer, delivery service, worker of the retailer) having an obligation to deliver products 190 to or for the retailer. In the embodiment of FIG. 1, the retailer computing device 150 is configured for data entry and processing as well as for communication with other devices of system 100 via the network 125 which, as described above. In some embodiments, as will be described below, the retailer computing device 150 is configured to access one or more of the inventory management database 160 and customer information database 140 via the network 125 to facilitate delivery of the products 190 ordered by a customer to a vehicle 180 designated for delivery by the customer.

In the exemplary system 100 of FIG. 1, the retailer computing device 150 is in two-way communication with the AGV 110 via the network 125. For example, the retailer computing device 150 is configured, in some approaches, to transmit at least one signal to the AGV 110 to cause the AGV 110 to move toward and/or away from the vehicle 180 designated by the customer in order to transport, pick up, and/or drop off the product or products 190 ordered by the customer. In some embodiments, the retailer computing device 150 is configured to cause the UAV 110 to travel to a physical location of the vehicle 180 designated by the customer, locate the vehicle 180, cause the AGV 110 to wait a predetermined time at the designated vehicle 180, and permit the customer to retrieve the products 190 from the AGV 110, for example, after verification of the customer's identity by the AGV 110 (or by the retailer computing device 150). In some embodiments, as will be described in more detail below, the retailer computing device 150 may be configured to determine whether one or more product pick/up and/or drop off conditions for the AGV 110 are met prior to instructing the AGV 110 to move into a product unloading position proximate the vehicle 180 and to unlock a cargo space 119 of the AGV 110 in order to permit the customer to retrieve one or more products 190 ordered by the customer therefrom.

The AGV 110 is generally a vehicle configured to autonomously traverse one or more intended environments in accordance with one or more routes and/or determined paths, and typically without the intervention of a human or a remote computing device, while retaining products 190 therein and delivering the products 190 and/or to perform one or more tasks. In some instances, however, a remote operator or a remote computer (e.g., retailer computing device 150) may temporarily or permanently take over operation of the AGV 110 using feedback information from the AGV 110 (e.g., audio and/or video content, sensor information, etc.) communicated to a remote navigation center and/or central control system (e.g., via network 125 or other similar distributed network).

The exemplary AGV 110 of FIG. 1 includes one or more data stores 112, sensors 114, and emitters 116 each in communication with one or more control circuits 118. In some embodiments, emitter 116 and sensor 114 are implemented together through a single device. The AGV 110 deployed in some embodiments of the exemplary system 100 does not require physical operation by a human operator and wirelessly communicates with, and is wholly or largely controlled by, the retailer computing device 150. For example, the retailer computing device 150 may control directional movement of the AGV 110 to a physical location of the vehicle 180 based on a variety of inputs. In some approaches, the control circuit 118 of the AGV 110 is programmed with GPS coordinates of a physical location of the vehicle 180 where the products 190 are to be delivered, and is configured to determine a route of the AGV 110 to the vehicle 180 and to cause the AGV 110 to move toward the physical location of the vehicle 180 without receiving remote signals (e.g., route instructions) from the retailer computing device 150.

In some embodiments, the emitter 116 is configured as a two-way transceiver that can receive the route instructions transmitted from the retailer computing device 150 and that can send one or more signals to the retailer computing device 150. For example, the retailer computing device 150 may be configured to analyze GPS coordinates of the physical location of the vehicle 180 designated by the customer, to determine a route for the AGV 110 to the physical location of the vehicle 180, and to transmit to the AGV 110 a signal over the network 125 including route instructions to guide the AGV 110 to the physical location of the vehicle 180 along the determined route. In turn, the AGV 110, upon receipt of such a signal from the retailer computing device 150, is configured to navigate, based on the route instructions, to the physical location of the vehicle 180 while retaining the products 190 ordered by the customer therein.

In some embodiments, the emitter 116 of the AGV 110 is configured to transmit, via the network 125, a signal including an electronic confirmation that the product 190 ordered by the customer has been delivered by the AGV 110 to the vehicle 180 designated by the customer. In one approach, in response to receipt from the AGV 110 of the electronic confirmation that the product 190 ordered by the customer has been delivered to the vehicle 180 designated by the customer, the computing device 150 is configured to transmit, to the customer computing device 120, an electronic alert that the product 190 ordered by the customer has been delivered to the vehicle 180 designated by the customer. In some configurations, the emitter 116 of the AGV 110 is configured to receive, via the network 125, a signal including a one-time code from a Wi-Fi router or another two-way communication transceiver (installed in the vehicle 180, home, or office of the customer), the one-time code enabling the emitter 116 of the AGV 110 to connect to such a Wi-Fi router or another two-way communication transceiver, and to send signals directly to and receive signals directly from the customer computing device 120. For example, in some aspects, when the emitter 116 of the AGV 110 is connected to the aforementioned Wi-Fi router or another two-way communication transceiver via the one-time code received by the emitter 116, the emitter 116 is permitted to transmit, directly to the customer computing device 120, an alert indicating that the product 190 ordered by the customer has been delivered to the vehicle 180 designated by the customer. Similarly, in some aspects, when the emitter 116 of the AGV 110 is connected to such a Wi-Fi router or another two-way communication transceiver via the aforementioned one-time code, the customer computing device 120 would be permitted to transmit, directly to the emitter 116 of the AGV 110, a notification indicating that the customer cannot retrieve the product 190 from the AGV 110 at all, or a notification indicating a specific time or a time frame when the customer can retrieve the product 190 delivered by the AGV 110 from the AGV 110 at the vehicle 180 of the customer.

In some configurations, based on the route instructions or a separate signal received from the retailer computing device 150, the AGV 110 is configured to remain proximate the vehicle 180 designated for delivery by the customer while retaining the products 190 ordered by the customer therein for a period of time indicated in the route instructions or in the separate control signal. In some embodiments, the AGV 110 is configured to, in response to either a control signal from the retailer computing device 150, or a verification code entered by the customer, to permit the customer to retrieve the products 190 ordered by the customer from an interior cargo space of the AGV 110. According to some embodiments, the emitter 116 of the AGV 110 is also configured to transmit, via the network 125, a signal including an electronic confirmation that the product 190 ordered by the customer has been retrieved by the customer from the AGV 110 at the vehicle 180 designated as the delivery location by the customer. In some approaches, in response to receipt of such an electronic confirmation from the AGV 110, the retailer computing device 150 is configured to transmit return route instructions to the AGV 110 to guide the AGV 110 back to a deployment station of the AGV 110, or to another vehicle 180 designated as a delivery location by another customer of the retailer.

In some embodiments, the AGV 110 includes one or more propulsion systems (e.g., motors, wheels, tank treads, etc.) that enable the AGV 110 to at least accelerate, deaccelerate, and/or traverse an environment using a navigation coordinate system, such as GPS, coordinate mapping information, beacon location information, cellular signal triangulation, other navigation systems and/or information, or a combination of two or more of such navigation systems and/or information. Further, the navigation coordinate system can be configured to provide location information, and in some instances time information. In some embodiments, the AGV 110 is configured to operate in different weather conditions, and/or can be readily modified depending on expected weather conditions (e.g., wheels replaced with tank treads when it is anticipated that the AGV 110 may encounter snow and/or ice). The AGV 110 can, in some applications, be further configured to communicate with other AGVs, other autonomous vehicles (e.g., unmanned aerial vehicles (UAVs)), transport vehicles, multiple different types of computing devices, a remote central control system, other computing devices, remote databases, and/or other such devices.

In some embodiments, the emitter 116 of the AGV 110 is a wired or a wireless transceiver configured to convey information, notifications, warnings and/or deterrents to a customer, a worker of the retailer, a potential threat (e.g., animal, person that is a potential threat), unknown third party, a remote central control system, a security service, a municipal police service, other such entities, or combination of two or more of such entities. The emitter 116 can comprise one or more output devices (e.g., speakers, displays, whistles, buzzers, lights and similar items) that convey text, audio, and/or visual signals. In some embodiments, emitter 116 can be configured to convey notifications having textual, audible and/or visual content. Similarly, the emitter 116 may additionally or alternatively be configured to facilitate wireless data communications with a computing device, including but not limited to, retailer computing device 150.

In some embodiments, the emitter 116 may be configured to emit one or more irritants. For example, an "irritant" can include one or more stimuli or agents that can cause a "hostile" person, animal, or the like to not touch or tamper with the AGV 110 and/or to remove themselves from a predetermined perimeter about the AGV 110. Applicable irritants can include chemical, audible, visual irritants, or combination of two or more such irritants. In some embodiments, the emitter 116 can comprise one or more reservoirs, pumps, nozzles, motors, compressed gas, etc. that can be used to eject and/or adjust the direction of emission of the irritant. Additionally or alternatively, the output devices of the emitter 116 may include one or more speakers, whistles, buzzers, and the like that can be activated to generate one or more warnings (e.g., that may gradually increase in volume) audible irritants, and/or deterrent noises. Audible irritants can be substantially any relevant audible noise that can provide an alert, warn and/or deter interaction with the AGV 110. For example, audible irritants can include audible sounds within a frequency range of about 2 kHz to about 5 kHz, canine-specific audible sounds, sounds having a volume greater than one or more thresholds, audible alerts that can be understood by a person, and/or other such audible alerts and/or irritants.

In some instances, one or more emitters 116 enable the AGV 110 to progressively escalate the deterrent effect of the deterrent and/or irritant. For example, the AGV 110 may initiate the generation of an audible alert when a human, animal, automobile, or the like is detected within a first threshold distance (which may depend on a speed at which the animal, person, automobile, etc. is approaching), increase the volume of the audible alert when within a second threshold distances (less than the first threshold distance), spray one or more streams of water when within a third threshold distance (less than the second distance), and spray prepper spray when within a fourth threshold distance for more than a threshold period of time and/or contacts the AGV 110.

The exemplary AGV 110 further includes one or more sensors 114. The sensors 114 can include substantially any relevant device that provides information to the AGV 110 to be used in navigation, customer detection, potential threat detection, distance measurements, environment mapping, location determination, and/or other such sensor information. In some embodiments, the sensor 114 includes one or more devices that can be used to capture data related to one or more objects located within a threshold distance relative to the AGV 110. For example, the AGV 110 includes at least one sensor 114 configured to detect at least one obstacle between the AGV 110 and the vehicle 180 designated as the delivery location by the customer along the route determined by the retailer computing device 150 for the AGV 110. Based on the detection of one or more obstacles by such a sensor 114, the AGV 110 is configured to avoid the obstacle(s).

In some embodiments, one or more sensors 114 can be included and/or cooperated with the AGV 110 that include, but are not limited to, one or more sensors to detect an object within one or more threshold or predetermined distances of the AGV 110, capture data within a threshold distance relative to AGV 110, detect movement, measure temperature, capture images and/or video, capture thermographic, infrared, and/or multi spectral images, capture images of entities attempting to tamper with AGV 110, one or more accelerometers, one or more gyroscopes, one or more odometers, one or more location sensors, one or more microphones (e.g., which can be configured to capture audible authentication codes and/or voice prints, threatening language, verbal input from customers, verbal inquiries from customers, etc.), one or more distance measurement sensors (e.g., laser sensors, sonar sensors, sensors that measure distance by emitting and capturing a wireless signal (which can comprise light and/or sound) etc.), 3D scanning sensors, other such sensors, or a combination of two or more of such sensors.

In some aspects, the AGV 110 includes one or more sensors 114 in communication with one or more access panels of AGV 110 and/or positioned adjacent to such access panels to sense when such panels are tampered with. In some aspects, the AGV 110 includes one or more sensors configured to detect the temperature in the cargo space 119 of the AGV 110 and coupled to one or more controllers configured to raise or lower the temperature of the cargo space 119 of the AGV 110 in order to preserve the freshness of the product 190 or to bring the product 190 to an appropriate consumption temperature.

In some embodiments, the AGV 110 includes a sensor 114 configured to detect a combination of letters and/or numbers on a license plate of the vehicle 180 designated as a delivery location by the customer. For example, the emitter 116 AGV 110 can be configured to transmit sensor data including the combination of letters and/or numbers detected by the sensor 114 on the license plate of the vehicle 180 to the retailer computing device 150, enabling the retailer computing device 150 to authenticate the vehicle 180 based on the received sensor data. In some embodiments, the sensor 114 is configured to detect the presence of the vehicle 180, for example, via detecting a transmitter (e.g., a beacon) installed in the vehicle 180, or via detecting the customer computing device 120 left in the interior of the vehicle 180.

In some embodiments, one or more data stores 112 provide an information repository that typically stores programs 111 and files 113. The AGV 110 may, in some embodiments, further access one or more programs 111, files 113, and/or other relevant information external to AGV 110 and accessible via network 125. Files 113 can comprise information transmitted by the retailer computing device 150, data captured by the sensor 114, customer information, customer identifier information, computing device identifier information, product information, customer order information, navigation and/or routing information, location information, mapping information, AGV identifier information, communication procedures, threat information, sensor data, images, video, historic information, and/or other such information, and/or other such information. For example, in some embodiments, files 113 can further comprise one or more notification templates, which are software used by the AGVs 110 as a basis to convey salutations and/or advertisements to customers and/or pedestrians located within a threshold distance relative to the AGVs 110. Notification template's content may at least be provided by product manufacturers and/or owners of the AGVs 110. In some embodiments, notification templates may further be personalized using customer's specific information to, for example, target a specific customer and increase engagement between the customer and the AGV 110.

Personalized notifications can reference customer history, current needs, anticipated needs, and/or similar information that can increase the probability that customers make desired product and/or service purchases. Commercial product information and/or customer specific information may be added to notification templates in real-time prior to their transmission by the AGVs 110 when the presence of customers and/or pedestrians is detected by the AGV 110.

Commercial product information can include, for example, product names, product types, manufacturer names, manufacturer origin, ingredient names, ingredient types, component names, and/or component types. Notification templates can comprise audio and/or visual components, for example, music, speech, tones, images, and/or video. Files 113 can further comprise personal and/or non-public information about the customers, including but not limited to, information about browser history, location, birthdays, delivery dates, spouses, pets, and/or heirs associated with the customers. Files 113 can comprise predetermined biometric data associated with the customers, which can be used for authentication purposes, and/or determining unknown and/or hostile third parties. Applicable biometric data can include, but is not limited to voice prints, iris patterns, retina-patterns, hand geometries, earlobe geometries, facial landmarks, thermographic signatures, vascular patterns, skin texture data points, and/or walking gate data points. Predetermined biometric data can include data captured by the sensors 114, provided by the customers, external sensors, and/or received from an external central computing system.

As described above, the AGV 110 further includes programs 111 that are stored in the data store 112 and/or other memory, and utilized at least by the one or more control circuits 118. In some applications, one or more of the programs 111 are software that are executed by the one or more control circuits 118 to facilitate the operation, control, commercial activity, interaction with customers, deterring potential danger and the like to the AGV 110. For example, the one or more control circuits 118, in executing one or more programs 111, can use data generated by sensors 114 to detect when customers or hostile third parties are positioned within a threshold distance relative to the AGVs 110, generate notifications in response to detecting the presence of customers and/or hostile third parties, as well as generate notifications in response to receiving triggering events from the retailer computing device 150. For example, the presence of customers positioned within threshold distances relative to AGVs 110 can be confirmed using geolocation data, which reflects the locations of the customers, received from the retailer computing device 150 (e.g., based on GPS data obtained from the customer computing device 120).

Hostile third parties can refer to any human or animal or autonomous vehicle attempting to interfere with the operation of AGV 110, which may, for example, be characterized as any attempts to gain unauthorized access to the cargo space 119 of the AGV 110, attempts to gain unauthorized access to the AGV 110 software and/or hardware, attempts to gain unauthorized access to products 190 being transported by the AGV 110, attempt to damage the AGV 110, attempts to obstruct the travel path of AGV 110, and/or other activities that may be detrimental to the AGV 110, and/or interfere with the AGV 110.

Additionally or alternatively, control circuit 118, in executing one or more programs 111, can generate one or more types of biometric data (discussed above) using information captured via sensor 114, and determine whether the generated biometric data has one or more threshold relationships to predetermined biometric data included in files 113, wherein generated biometric data having threshold relationships identify customers and such data lacking the threshold relationships identify unknown and/or hostile third parties.

With reference to FIG. 1, in some embodiments, the vehicle 180 designated by the customer for delivery of the products 190 includes an electronic device configured to transmit the GPS coordinates of the physical location of the vehicle 180 designated as the delivery location by the customer to the retailer computing device 150. Such an electronic device may be in the form of an installed transceiver 182 configured to transmit and/or receive data. In some approaches, the electronic device may be in the form of the customer computing device 120 left in the interior of the vehicle 180 for the purpose of transmit the GPS coordinates of the physical location of the vehicle 180. Thus, the retailer computing device 150 can obtain GPS coordinates of the physical location of the vehicle 180 based on the GPS coordinates transmitted to the retailer computing device 150 from one or more GPS transmitting electronic devices installed or otherwise located in the vehicle 180. In some embodiments, the vehicle 180 designated by the customer includes a transceiver configured for one or two way communication with the emitter 116 of the AGV 110 when the AGV 110 is located within a predetermined distance of the vehicle 180.

Figure 2:
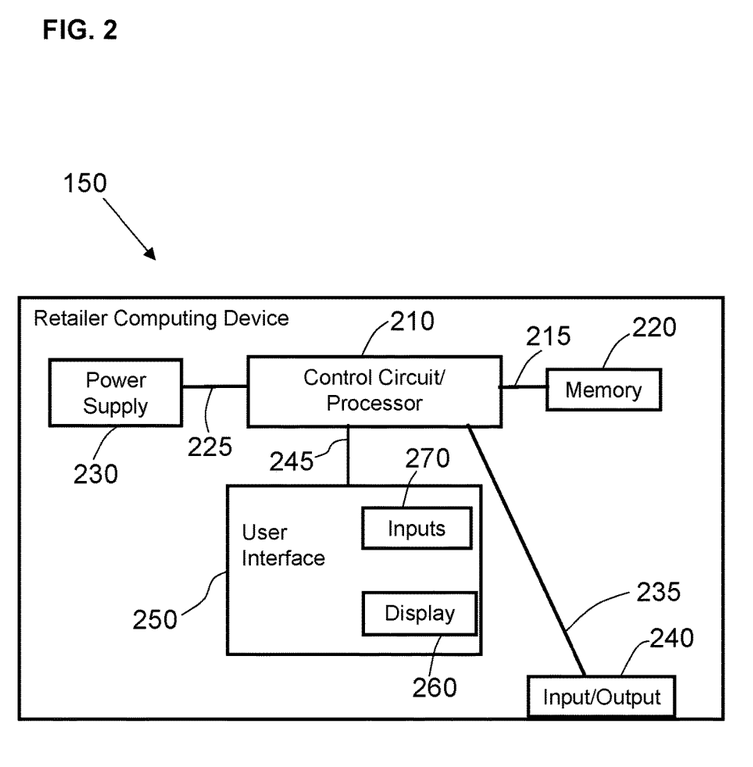
FIG. 2 is a functional diagram of an exemplary retailer computing device usable with the system of FIG. 1 in accordance with some embodiments.

With reference to FIG. 2, an exemplary retailer computing device 150 configured for use with the systems and methods described herein may include a control circuit or control unit 210 including a processor (for example, a microprocessor or a microcontroller) electrically coupled via a connection 215 to a memory 220 and via a connection 225 to a power supply 230. The control unit 210 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control unit 210 of the retailer computing device 150 can be configured (for example, by using corresponding programming stored in the memory 220 as will be well understood by those skilled in the art) to carry out one or more of the steps, actions, and/or functions described herein. In some embodiments, the memory 220 may be integral to the processor-based control unit 210 or can be physically discrete (in whole or in part) from the control unit 210 and is configured non-transitorily store the computer instructions that, when executed by the control unit 210, cause the control unit 210 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

The control unit 210 of the retailer computing device 150 is also electrically coupled via a connection 235 to an input/output 240 that can receive signals from the order processing server 130 (e.g., data from the customer information database 140 relating to an order for a product 190 placed by the customer and/or information (e.g., GPS coordinates) associated with a physical location of the vehicle 180 selected by the customer) or from any other source that can communicate with the retailer computing device 150 via a wired or wireless connection. The input/output 240 of the retailer computing device 150 can also send signals to the order processing server 130 (e.g., electronic notification confirming retrieval of the product 190 by the customer from the AGV 110), or to any other device in wired or wireless communication with the retailer computing device 150.

In the embodiment shown in FIG. 2, the processor-based control unit 210 of the retailer computing device 150 is electrically coupled via a connection 245 to a user interface 250, which may include a visual display or display screen 260 (e.g., LED screen) and/or button input 270 that provide the user interface 250 with the ability to permit an operator of the retailer computing device 150 to manually control the retailer computing device 150 by inputting commands via touch-screen and/or button operation and/or voice commands to, for example, to communicate with the customer computing device 120 and/or an AGV 110. It will be appreciated that the performance of such functions by the processor-based control unit 210 of the retailer computing device 150 is not dependent on a human operator, and that the control unit 210 may be programmed to perform such functions without a human operator.

In some embodiments, the display screen 260 of retailer computing device 150 is configured to display various graphical interface-based menus, options, and/or alerts that may be transmitted to the retailer computing device 150 and displayed on the display screen 260 in connection with various aspects of the order placed by the customer. The inputs 270 of the retailer computing device 150 may be configured to permit an operator to navigate through the on-screen menus on the retailer computing device 150 and make changes and/or updates to the physical location of the vehicle 180 designated by the customer for delivery of the product 190. It will be appreciated that the display screen 260 may be configured as both a display screen and an input 270 (e.g., a touch-screen that permits an operator to press on the display screen 260 to enter text and/or execute commands.)

In some embodiments, the control circuit 210 of the retailer computing device 150 is programmed to determine that one or more products 190 ordered by the customer via the order processing server 130 is to be delivered to a vehicle 180. For example, when the customer places an order for one or more products 190 via the processing server 130, the customer is provided with an input field 124 on the graphical interface 122 of the customer computing device 120 prompting the customer to select a delivery option, with one of the available options being delivery of the product 190 to a vehicle 180 designated by the customer. In some embodiments, the control circuit 210 of the retailer computing device 150 is programmed to authorize commencement of a delivery attempt of the product 190 to the customer after verification that vehicle 180 has been located.

In one aspect, prior to, or after the commencement of the delivery attempt of one or more products 190 to the vehicle 180 designated for delivery by the customer, the control circuit 210 of the retailer computing device 150 is programmed to receive and/or otherwise obtain the physical location of the vehicle 180. For example, in a situation where the customer requested delivery of the products 190 to a vehicle 180 selected by the customer, the control circuit 210 may obtain the GPS coordinates associated with the vehicle 180 selected by customer from the customer information database 140 (or directly from a transmitter located in the vehicle 180).

In some embodiments, when the delivery of the product 190 via the AGV 110 is in progress, and more specifically, after the AGV 110 has arrived at the physical location of the vehicle 180, the control unit 210 is configured to receive, via the network 125, an authentication of an identity of the customer (or of an authorized person accepting delivery of the product 190 on behalf of the customer) attempting to retrieve the product 190 from the AGV 110. In one aspect, the sensor 114 of the AGV 110 may include a video camera configured to visually inspect a physical identification card (e.g., Driver's License) of the customer or person accepting delivery on behalf of the customer and generate identity detection data. The emitter 116 of the AGV 110 may then transmit such identity detection data over the network 125 to the retailer computing device 150, after which the control unit 210 of the retailer computing device 150 is configured to obtain (e.g., from the customer information database 140) authentic identification data associated with the customer or authorized person to determine whether there is a match.

The control unit 210 is further configured to send a return signal (via the input/output 240) to the AGV 110 to instruct the AGV 110 as to whether or not to grant access to the cargo space 119 of the AGV 110 to the customer or person attempting to accept delivery based on whether the identity detection data associated with the customer or person attempting to accept delivery matched the authentic identification data stored in the customer information database 140. In some embodiments, the control unit 210 is configured to authorize (e.g., via a transmission of a signal over the network 125 to the AGV 110) the AGV 110 to unlock the cargo space 119 and permit the customer to retrieve the product 190 from the cargo space 119 based on the authentication of the identity of the customer, which may be performed as described above. In one aspect, upon a successful completion of a delivery of the product 190 to the customer at the physical location of the vehicle 180 selected by the customer for delivery of the product 190, the control circuit is 210 of the retailer computing device 150 is configured to receive, over the network 125, from the customer computing device 120 and/or from the AGV 110, an electronic confirmation that the product 190 has been successfully delivered to the customer.

In some embodiments, the control circuit 210 of the retailer computing device 150 is programmed to generate customer alerts in connection with the delivery of the products 190 to the customer or a person authorized to receive the products 190 on behalf of the customer. The customer alerts may be generated by the retailer computing device 150 based on information received from the AGV 110. In the embodiment shown in FIG. 1, the customer alerts may be transmitted from the retailer computing device 150 via the network 125 to the customer computing device 120, and the customer computing device 120 may transmit data responsive to the customer alerts and/or other data to the retailer computing device 150 via the network 125. For example, the retailer computing device 150 may transmit a signal over the network 125 to the customer computing device 120 including an alert indicating that the AGV 110 has arrived at the physical location of the vehicle 180 designated by the customer as the delivery location, or an alert indicating that the AGV 110 was unable to successfully reach the vehicle 180. Similarly, the customer computing device 120 may transmit a signal over the network 125 to the retailer computing device 150 including a notification that the product 190 ordered by the customer has been successfully retrieved by the customer from the AGV 110. In some embodiments, customer alerts sent to the customer computing device 120 may include but are not limited to short message service (SMS) messages, electronic mail (e-mail) messages, instant messenger messages, voice mail messages, and/or push notifications (to a mobile app on the customer computing device 120).

Figure 3:
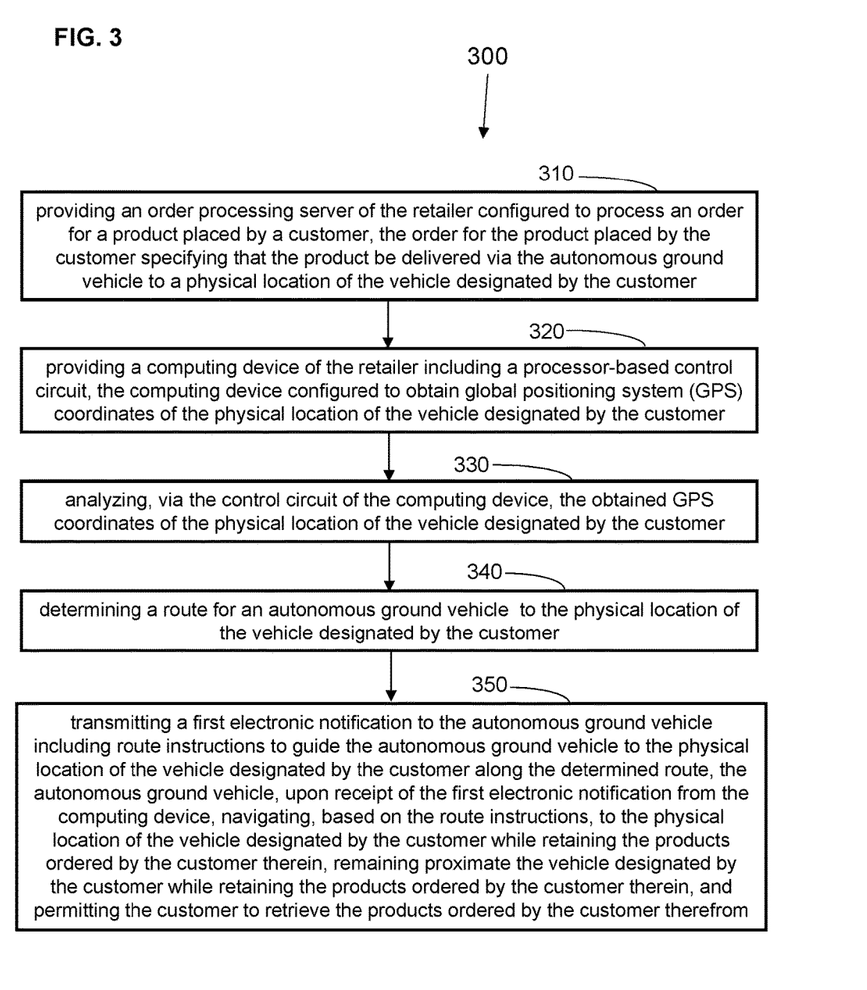
FIG. 3 is a flow chart diagram of a process of facilitating delivery via AGVs of products ordered by a customer of a retailer to a physical location of a vehicle designated by the customer in accordance with some embodiments.

FIG. 3 shows an embodiment of an exemplary method 300 of facilitating delivery of products 190 ordered by a customer of a retailer to a physical location of a vehicle 180 designated by the customer via an AGV 110. The embodiment of the method 300 illustrated in FIG. 3 includes providing an order processing server 130 of the retailer configured to process an order for a product 190 placed by a customer, with the order for the product 190 placed by the customer specifying that the product 190 be delivered via an AGV 110 to a physical location of the vehicle 180 designated by the customer (step 310). Of course, it will be appreciated that in some embodiments, the customer may not be permitted to specify, when placing the order, that the order be delivered via an AGV 110, and instead may only be permitted to specify that the order be delivered to a physical location of a vehicle 180 designated by the customer.

The exemplary method 300 of FIG. 3 further includes providing a computing device 150 of the retailer including a processor-based control circuit and configured to obtain global positioning system (GPS) coordinates of the physical location of the vehicle 180 designated by the customer (step 320). As discussed above, in some embodiments, the retailer computing device 150 tracks the geographic location of the vehicle 180 designated as the delivery location by the customer via global positioning system (GPS) data associated with the vehicle 180 and/or the customer computing device 120. Such GPS data may be obtained by the retailer computing device 150 from the customer information database 140, or may be received in real-time from a transceiver provided in the vehicle 180 or from the customer computing device 120 left by the customer in the vehicle 180 to facilitate the locating of the vehicle 180 by the retailer computing device 150 and/or the AGV 110. In some embodiments, the retailer computing device 150 sets (and sends to the customer information database 140 for storage) the identity of the delivery location based on the tracked geographic location of the transceiver associated with the vehicle 180 or the tracked geographic location of the customer computing device 120.

After the GPS coordinates of the physical location of the vehicle 180 are obtained by the retailer computing device 150, the exemplary method 300 of FIG. 3 includes analyzing, via the control circuit 210 of the retailer computing device 150, the obtained GPS coordinates of the physical location of the vehicle 180 designated by the customer (step 330). As described above, the AGV 110 is equipped with an emitter 116 that is configured to transmit GPS coordinates of the AGV 110 in real-time, as the AGV 110 is moving toward the physical location of the vehicle 180. The GPS coordinates of the AGV 110 may be transmitted by the emitter 116 to the retailer computing device 150 directly, or may be transmitted for storage to the customer information database 140.

In one approach, after the retailer computing device 150 obtains the geographic coordinates of the AGV 110 that is attempting delivery and of the vehicle 180 that serves as the delivery location, the control circuit 210 of the retailer computing device 150 is programmed to analyze the relative geographic locations of the AGV 110 and the vehicle 180. To that end, the exemplary method of FIG. 3 includes determining a route for the AGV 110 to the physical location of the vehicle 180 designated by the customer.

In some embodiments, the retailer computing device 150 determines an optimal travel route for the AGV 110 from the origin of travel (e.g., a deployment station) of the AGV 110 to the destination (e.g., the physical location of the vehicle 180) of the AGV 110. In some aspects, the retailer computing device 150 may calculate multiple possible optimum routes. In some embodiments, the system 100 integrates 2D and 3D maps of the navigable space of the AGV 110 with physical locations of objects (e.g., trees, cars, houses, or the like) located between the deployment location of the AGV 110 and the destination location of the AGV 110. The 2D and 3D maps of relevant geographic locations may be downloaded in real-time or pre-stored in the customer information database 140. In one approach, after the retailer computing device 150 maps all objects to specific locations using algorithms, measurements and global position system (GPS) geo-location, the grids may be applied sectioning off the maps into access ways and blocked sections, enabling the AGV 110 use such grids for navigation and recognition. The grids may be applied to 2D horizontal maps along with 3D models. Such grids may start at a higher unit level and then can be broken down into smaller units of measure by the retailer computing device 150 when needed to provide more accuracy.

After the route of the AGV 110 to the vehicle 180 is determined by the retailer computing device 150, the method 300 depicted in FIG. 3 further includes transmitting a first electronic notification to the AGV 110 including route instructions to guide the AGV 110 to the physical location of the vehicle 180 designated by the customer along the determined route, with the AGV 110, upon receipt of the first electronic notification from the retailer computing device 150, navigating, based on the route instructions, to the physical location of the vehicle 180 designated by the customer while retaining the products 190 ordered by the customer therein, remaining proximate the vehicle 180 designated by the customer while retaining the products 190 ordered by the customer therein, and permitting the customer to retrieve the products 190 ordered by the customer therefrom (step 350). It will be appreciated that the route instructions, after being determined by the retailer computing device 150, can be recalculated by the control unit 210 of the retailer computing device 150 in real-time, for example, if an obstacle or another movement restriction is detected along the originally calculated route of the AGV 110, or if the customer moves the vehicle 180 to a different location and notifies the system 100 of the location change.

While only AGV 110 is shown in FIG. 1 for ease of illustration, it will be appreciated that in some embodiments, the system 100 may include any number of AGVs 110 and the retailer computing device 150 may simultaneously communicate with and/or transmit route instructions to more than one (e.g., 5, 10, 50, 100, 1000, or more) AGVs 110 simultaneously to guide the AGVs 110 along the routes determined by the retailer computing device 150 in order to transport products 190 to their respective delivery destinations (e.g., vehicles 180). Similarly, while only one vehicle 180 is depicted in FIG. 1 for ease of illustration, it will be appreciated that in some embodiments, one or more AGVs 110 of the system 100 may be simultaneously guided by one or more retailer computing devices 150 to deliver products 190 to more than one (e.g., 5, 10, 50, 100, 1000, or more) vehicles 180 at different locations. As described above, the AGV 110, after receiving a signal including the route instructions from the retailer computing device 150 over the network 125, navigates to the physical location of the vehicle 180 based on the route instructions while retaining the products 190 ordered by the customer therein.

In some embodiments, after the AGV 110 arrives to the location (e.g., a parking lot or a parking structure) where the vehicle 180 is located, the AGV 110, which is already programmed with the GPS coordinates of the vehicle 180, attempts to verify the identity of the vehicle 180 by attempting to detect (via the sensor 114) the combination of letters and numbers on a license plate of the vehicle or vehicles present in the location associated with the GPS coordinates. As such, even if ten or more vehicles are present in the location associated with the GPS coordinates provided to the AGV 110, given that each of the vehicles has a unique license plate, the detection of the license plates of the vehicles 180 facilitates the AGV 110 in delivering the product 190 precisely to the vehicle 180 of the customer. In one approach, the license plate information associated with the vehicle 180 of the customer is stored in the customer information database 140, and can be obtained for verification purposes either by the AGV 110 directly, or by the retailer computing device 150 after the AGV 110 transmits sensor data including the combination of letters and numbers detected by the sensor 114 on the license plate of the vehicle 180, which enables the retailer computing device 150 to authenticate the vehicle 180.

In some embodiments, the emitter 116 of the AGV 110 is configured to communicate directly with a transceiver located in the vehicle 180 in order to further verify the identity of the vehicle 180 designated by the customer for delivery. The emitter 116 and the transceiver in the vehicle 180 may, in one approach, communicate when the AGV 110 is within a predetermined distance (e.g., 10-50 feet). In some embodiments, the emitter 116 and the transceiver in the vehicle 180 communicate via the network 125 (e.g., via a cellular or a Bluetooth (e.g., BLE)) connections. Such direct communication between the AGV 110 and the vehicle 180 advantageously facilitates the precise identification of the vehicle 180 in situations when the sensor 114 of the AGV 110 is unable to read the license plate of the vehicle 180, or when the vehicle 180 does not have a license plate, which is common for new vehicles.

In some embodiments, after arriving at the physical location of the vehicle 180, the sensor 114 of the AGV 110 scans for the presence of available charge ports where the AGV 110 may be recharged. For example, one or more docking stations where the AGV 110 may dock and recharge may be provided at large parking structures and/or parking lots.

After authentication of the vehicle 180 where the product 190 being transported by the AGV 110 is to be delivered, in some embodiments, the AGV 110 transmits (e.g., via the emitter 116 over the network 125) a signal including an electronic confirmation that the product 190 ordered by the customer has been delivered by the AGV 110 to the vehicle 180 designated by the customer. In one approach, such an electronic confirmation is sent directly to the retailer computing device 150, although the electronic confirmation may be instead sent to the customer information database 140 for retrieval by the retailer computing device 150. In some embodiments, as discussed above, the electronic confirmation that the product 190 being transported by the AGV 110 has been delivered by the AGV 110 to the vehicle 180 designated by the customer is transmitted via the AGV 110 directly to the customer computing device 120. For example, in some aspects, the emitter 116 of the AGV 110 is configured to receive, via the network 125, a signal including a one-time code from a Wi-Fi router or another two-way communication transceiver (installed in the vehicle 180, home, or office of the customer). This one-time code enables the emitter 116 of the AGV 110 to connect to such a Wi-Fi router or another two-way communication transceiver, and to be in two-way direct communication with the customer computing device 120. For example, in some aspects, as described above, in some embodiments, the emitter 116 is permitted to transmit, directly to the customer computing device 120, an alert indicating that the product 190 ordered by the customer has been delivered to the vehicle 180 designated by the customer. In other embodiments, the emitter 116 is configured to receive, directly from the customer computing device 120, a notification indicating that the customer cannot retrieve the product 190 from the AGV 110 at all, or a notification indicating a specific time or a time frame when the customer can retrieve the product 190 delivered by the AGV 110 from the AGV 110 at the vehicle 180 of the customer.

In some embodiments, after receipt from the AGV 110 of such an electronic confirmation, the retailer computing device 150 transmits an electronic notification to the customer computing device 120 indicating that the product 190 ordered by the customer has been delivered to the vehicle 180 designated by the customer. In some configurations, when the route instructions transmitted to the AGV 110 by the retailer computing device 150 include an instruction to the AGV 110 to remain proximate the vehicle 180 for a predetermined interval of time (e.g., 15 minutes, 30 minutes, 1 hour, or more than 1 hour), the AGV 110 is configured to remain proximate the vehicle 180 for the period of time indicated in the route instructions, and the electronic notification transmitted by the retailer computing device 150 to the customer computing device 120 includes an indication of the interval of time that the AGV 110 will wait at the vehicle 180 for the customer to retrieve the product 190 from the cargo space 119 of the AGV 110.

In some embodiments, the electronic notification transmitted by the retailer computing device 150 to the customer computing device 120 includes a verification code that the customer would be required to provide to the AGV 110 (either via the customer computing device 120 or by manually entering via an interface of the AGV 110) in order to gain access to the cargo space 119 of the AGV 110. As described above, instead of a verification code that must be entered or otherwise transmitted by the customer, the AGV 110 according to some embodiments is equipped with a sensor 114 configured to detect biometric data associated with the customer, enabling the verification of the customer via the biometric data detected by the sensor 114. As described above, the AGV 110, in response to either a control signal from the retailer computing device 150, or a verification code or biometric data entered by the customer, permits the customer to retrieve the product 190 ordered by the customer from the cargo space 119 of the AGV 110.

For example, after the customer or person attempting to retrieve the product 190 from the AGV 110 is authenticated as an authorized person, the AGV 110 either opens the cargo space 119 to permit the customer to remove the product 190 from the cargo space 119, or ejects the product 190 from the cargo space 119 without opening the cargo space 119 to access by the customer. In addition, in some configurations, the emitter 116 of the AGV 110 is also configured to transmit, via the network 125, a signal including an electronic confirmation that the product 190 ordered by the customer has been retrieved by the customer from the AGV 110 at the vehicle 180 designated as the delivery location by the customer. In one approach, in response to receipt of such an electronic confirmation from the AGV 110, the retailer computing device 150 transmits a signal including updated route instructions to the AGV 110 to guide the AGV 110 back to a deployment station of the AGV 110, or to another vehicle 180 designated as a delivery location by another customer of the retailer. In turn, the AGV 110, upon receipt of such a signal from the retailer computing device 150, navigates either back to a deployment station or to the next delivery destination based on the updated route instructions. In some embodiments, in response to receipt of the electronic confirmation from the AGV 110 that an authorized customer retrieved the product 190 from the AGV 110, the retailer computing device 150 transmits a signal to the order processing server 130 indicating that the order placed by the customer to have the product 190 delivered to the vehicle 180 has been successfully completed.

The systems and methods described herein advantageously allow customers to purchase products from a retailer and have the products conveniently delivered for the customers to the physical locations of their vehicles while the vehicles are parked and while the customers are away from the vehicles. Such systems and methods provide a significant convenience for the customers of the retailer and are likely to increase customer loyalty to the retailer. In addition, such systems and methods provide retailers with significant operation cost savings, since deliveries are made via autonomous ground vehicles that do not require a human operator.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for facilitating delivery of products ordered by a customer of a retailer to a delivery destination including a physical location of a vehicle designated by the customer via an autonomous ground vehicle, the system comprising:
   an order processing server of the retailer configured to process an order for a product placed by a customer, wherein the order for the product placed by the customer specifies that the product be delivered via the autonomous ground vehicle to the delivery destination including the physical location of the vehicle designated by the customer;
   a computing device of the retailer including a processor-based control circuit, the computing device configured to obtain global positioning system (GPS) coordinates of the physical location of the vehicle designated by the customer;
   wherein the control circuit is configured to analyze the obtained GPS coordinates of the physical location of the vehicle designated by the customer, determine a route for an autonomous ground vehicle to the physical location of the vehicle designated by the customer, and transmit a first electronic notification to the autonomous ground vehicle including route instructions to guide the autonomous ground vehicle to the physical location of the vehicle designated by the customer along the determined route; and
   wherein the autonomous ground vehicle, after receipt of the first electronic notification from the computing device, is configured to navigate, based on the route instructions, to the physical location of the vehicle designated by the customer while retaining the products ordered by the customer therein, to remain proximate the vehicle designated by the customer while retaining the products ordered by the customer therein, to transmit an electronic confirmation that the products ordered by the customer have been delivered by the autonomous ground vehicle to the delivery destination including the vehicle designated by the customer, to obtain identity detection data from a person attempting to retrieve the products from the autonomous ground vehicle at the delivery destination, and to permit the person attempting to retrieve the products from the autonomous ground vehicle at the delivery destination to retrieve the products ordered by the customer from the autonomous ground vehicle when an identity of the person attempting to retrieve the products from the autonomous ground vehicle at the delivery destination matches one of an identity of the customer who placed the order and an identity of a person authorized by the customer to pick up the products at the delivery destination from the autonomous ground vehicle.

2. The system of claim 1, wherein the vehicle designated by the customer includes one of an installed transmitter and a mobile communication device configured to transmit the GPS coordinates of the physical location of the vehicle designated by the customer to the control circuit of the computing device, and wherein the computing device is configured to obtain GPS coordinates of the physical location of the vehicle designated by the customer based on the GPS coordinates transmitted to the computing device from the one of the installed transmitter and the mobile communication device.

3. The system of claim 1, wherein the autonomous ground vehicle includes a transceiver configured to receive the route instructions transmitted in the first electronic notification from the computing device, the transceiver configured to send one or more signals to the computing device.

4. The system of claim 3, wherein the vehicle designated by the customer includes a transceiver, and wherein the transceiver of the autonomous ground vehicle is configured to communicate directly with the transceiver of the vehicle designated by the customer when the autonomous ground vehicle is within a predetermined distance of the vehicle designated by the customer.

5. The system of claim 1, wherein the autonomous ground vehicle includes at least one sensor configured to detect at least one obstacle between the autonomous ground vehicle and the vehicle designated by the consumer along the route determined by the control circuit of the computing device for the autonomous ground vehicle, and wherein the autonomous ground vehicle is configured to avoid the at least one obstacle based on detection of the at least one obstacle by the at least one sensor.

6. The system of claim 1, wherein the autonomous ground vehicle includes a sensor configured to detect a combination of letters and numbers on a license plate of the vehicle designated by the customer.

7. The system of claim 6, wherein the autonomous ground vehicle is configured to transmit sensor data including the combination of letters and numbers detected by the sensor on the license plate of the vehicle designated by the customer to the computing device, and wherein the control circuit of the computing device is configured to authenticate the vehicle designated by the customer based on the sensor data received from the autonomous ground vehicle.

8. The system of claim 1, wherein the control circuit of the computing devices is further configured to receive, from the autonomous ground vehicle, the electronic confirmation that the product ordered by the customer has been delivered by the autonomous ground vehicle to the delivery destination including the vehicle designated by the customer, and wherein, in response to receipt, from the autonomous ground vehicle, of the electronic confirmation that the product ordered by the customer has been delivered to the vehicle designated by the customer, the control circuit of the computing device is further configured to transmit, to a mobile computing device of the customer, an electronic alert that the product ordered by the customer has been delivered to the vehicle designated by the customer.

9. The system of claim 1, wherein the control circuit of the computing devices is further configured to receive, from the autonomous ground vehicle, an electronic confirmation that the product ordered by the customer has been retrieved by the customer from the autonomous ground vehicle at the vehicle designated by the customer.

10. The system of claim 9, wherein in response to receipt, from the autonomous ground vehicle, of the electronic confirmation that that the product ordered by the customer has been retrieved by the customer from the autonomous ground vehicle at the vehicle designated by the customer, the control circuit of the computing device is further configured to transmit, to the autonomous ground vehicle, return route information to guide the autonomous ground vehicle to a deployment station of the autonomous ground vehicle.

11. A method for facilitating delivery of products ordered by a customer of a retailer to a delivery destination including a physical location of a vehicle designated by the customer via an autonomous ground vehicle, the method comprising:
providing an order processing server of the retailer configured to process an order for a product placed by a customer, the order for the product placed by the customer specifying that the product be delivered via the autonomous ground vehicle to the delivery destination including the physical location of the vehicle designated by the customer;
providing a computing device of the retailer including a processor-based control circuit, the computing device configured to obtain global positioning system (GPS) coordinates of the physical location of the vehicle designated by the customer;
analyzing, via the control circuit of the computing device, the obtained GPS coordinates of the physical location of the vehicle designated by the customer;
determining a route for an autonomous ground vehicle to the physical location of the vehicle designated by the customer; and
transmitting a first electronic notification to the autonomous ground vehicle including route instructions to guide the autonomous ground vehicle to the physical location of the vehicle designated by the customer along the determined route, the autonomous ground vehicle, after receipt of the first electronic notification from the computing device, navigating, based on the route instructions, to the physical location of the vehicle designated by the customer while retaining the products ordered by the customer therein, remaining proximate the vehicle designated by the customer while retaining the products ordered by the customer therein, transmitting an electronic confirmation that the products ordered by the customer have been delivered by the autonomous ground vehicle to the delivery destination including the vehicle designated by the customer, obtaining identity detection data from a person attempting to retrieve the products from the autonomous ground vehicle at the delivery destination, and permitting the person attempting to retrieve the products from the autonomous ground vehicle at the delivery destination to retrieve the products ordered by the customer from the autonomous ground vehicle when an identity of the person attempting to retrieve the products from the autonomous ground vehicle at the delivery destination matches one of an identity of the customer who placed the order and an identity of a person authorized by the customer to pick up the products at the delivery destination from the autonomous ground vehicle.

12. The method of claim 11, wherein the vehicle designated by the customer includes one of an installed transmitter and a mobile communication device configured to transmit the GPS coordinates of the physical location of the vehicle designated by the customer to the control circuit of the computing device, and further comprising obtaining, via the computing device, GPS coordinates of the physical location of the vehicle designated by the customer based on the GPS coordinates transmitted to the computing device from the one of the installed transmitter and the mobile communication device.

13. The method of claim 11, further comprising providing the autonomous ground vehicle with a transceiver configured to receive the route instructions transmitted in the first electronic notification from the computing device and receiving from the transceiver, one or more signals sent by the transceiver at the computing device.

14. The method of claim 13, further comprising providing the vehicle designated by the customer with a transceiver, and communicating, via the transceiver of the autonomous ground vehicle, directly with the transceiver of the vehicle designated by the customer when the autonomous ground vehicle is within a predetermined distance of the vehicle designated by the customer.

15. The method of claim 11, further comprising providing the autonomous ground vehicle with at least one sensor configured to detect at least one obstacle between the autonomous ground vehicle and the vehicle designated by the consumer along the route determined by the control circuit of the computing device for the autonomous ground vehicle, and avoiding the at least one obstacle by the autonomous ground vehicle based on detection of the at least one obstacle by the at least one sensor.

16. The method of claim 11, further comprising providing the autonomous ground vehicle with a sensor configured to detect a combination of letters and numbers on a license plate of the vehicle designated by the customer.

17. The method of claim 16, further comprising transmitting, via the autonomous ground vehicle, sensor data including the combination of letters and numbers detected by the sensor on the license plate of the vehicle designated by the customer to the computing device, and authenticating, via the control circuit of the computing device, the vehicle designated by the customer based on the sensor data received from the autonomous ground vehicle.

18. The method of claim 11, further comprising receiving, via the control circuit of the computing devices of the retailer, from the autonomous ground vehicle, the electronic confirmation that the product ordered by the customer has been delivered by the autonomous ground vehicle to the vehicle designated by the customer, and wherein, in response to the receiving, from the autonomous ground vehicle, of the electronic confirmation that the product ordered by the customer has been delivered to the delivery destination including the vehicle designated by the customer, transmitting, via the control circuit of the computing device, to a mobile computing device of the customer, an electronic alert that the product ordered by the customer has been delivered to the vehicle designated by the customer.

19. The method of claim 11, further comprising receiving, via the control circuit of the computing devices of the retailer, from the autonomous ground vehicle, an electronic confirmation that the product ordered by the customer has been retrieved by the customer from the autonomous ground vehicle at the vehicle designated by the customer.

20. The method of claim 19, further comprising, in response to the receiving, from the autonomous ground vehicle, of the electronic confirmation that that the product ordered by the customer has been retrieved by the customer from the autonomous ground vehicle at the vehicle designated by the customer, transmitting, via the control circuit of the computing device, to the autonomous ground vehicle, return route information to guide the autonomous ground vehicle to a deployment station of the autonomous ground vehicle.

* * * * *

UNITED STATES PATENT AND TRADEMARK OFFICE
CERTIFICATE OF CORRECTION

PATENT NO. : 10,120,384 B2
APPLICATION NO. : 15/837342
DATED : November 6, 2018
INVENTOR(S) : Bruce W. Wilkinson et al.

It is certified that error appears in the above-identified patent and that said Letters Patent is hereby corrected as shown below:

In the Claims

Column 21, Line 6, in Claim 10, delete "that that" and insert -- that --.
Column 22, Line 65, in Claim 20, delete "that that" and insert -- that --.

Signed and Sealed this
Eleventh Day of December, 2018

Andrei Iancu
*Director of the United States Patent and Trademark Office*